(12) United States Patent
Salvat et al.

(10) Patent No.: US 6,397,584 B2
(45) Date of Patent: Jun. 4, 2002

(54) SYSTEM FOR ASSISTING THE REGENERATION OF A PARTICLE FILTER INTEGRATED INTO AN EXHAUST LINE OF A MOTOR VEHICLE DIESEL ENGINE

(75) Inventors: Olivier Salvat, Paris; Patrice Le Tallec, Sartrouville, both of (FR)

(73) Assignee: Peugeot Citroen Automobiles SA, Neuilly sur Seine (FR)

( * ) Notice: Subject to any disclaimer, the term of this patent is extended or adjusted under 35 U.S.C. 154(b) by 0 days.

(21) Appl. No.: 09/765,686

(22) Filed: Jan. 22, 2001

(30) Foreign Application Priority Data

Jan. 20, 2000 (FR) .............................. 00 00715

(51) Int. Cl.[7] ................................. F01N 5/04
(52) U.S. Cl. ............... 60/280; 60/278; 60/297; 60/311; 60/295; 123/1 A
(58) Field of Search .................. 60/278, 280, 295, 60/297, 311; 123/1 A; 44/335

(56) References Cited

U.S. PATENT DOCUMENTS

| | | | | |
|---|---|---|---|---|
| 4,835,964 A | * | 6/1989 | Kume et al. ................... | 60/285 |
| 5,123,243 A | * | 6/1992 | Baddour ....................... | 60/274 |
| 5,584,265 A | * | 12/1996 | Rao et al. .................... | 123/1 A |
| 5,711,149 A | * | 1/1998 | Araki ........................... | 60/278 |
| 5,758,496 A | * | 6/1998 | Rao et al. ..................... | 60/295 |
| 5,791,139 A | * | 8/1998 | Atago et al. .................. | 60/274 |
| 5,809,774 A | * | 9/1998 | Peter-Hoblyn et al. ....... | 60/274 |
| 6,063,350 A | * | 5/2000 | Tarabulski et al. ........ | 423/239.1 |

FOREIGN PATENT DOCUMENTS

| | | |
|---|---|---|
| DE | 3909932 A1 | 9/1990 |
| DE | 4234841 A1 | 4/1993 |
| JP | 59020511 | 2/1984 |

OTHER PUBLICATIONS

International Search Report dated Oct. 5, 2000, No. FA 582094 & FR 0000715, pp. 1–2.
Langkabel, "La plus grande invention depuis le moteur diesel", Revue Automobile, No. 19, May 1999, p. 21.

* cited by examiner

*Primary Examiner*—Thomas Denion
*Assistant Examiner*—Binh Tran
(74) *Attorney, Agent, or Firm*—Connolly Bove Lodge & Hutz LLP

(57) ABSTRACT

A system for assisting the regeneration of a particle filter integrated into an exhaust line of an engine that admits air into the engine and includes a valved return that selectively closes a path that recycles exhaust gas from the engine to the engine inlet. An additive is added to fuel, the additive deposited onto the particle filter to lower the combustion temperature of the particles trapped in the filter. A control system monitors the regeneration system and triggers a regeneration phase of the particle filter by combustion of the particles trapped in the engine, at the same time initiating a phase of multiple injections of fuel into the cylinders of the engine during their expansion phase. The control system further closes the recycling path during a regeneration phase of the particle filter to enable the monitoring of the composition of the gases at the inlet of the particle filter.

2 Claims, 1 Drawing Sheet

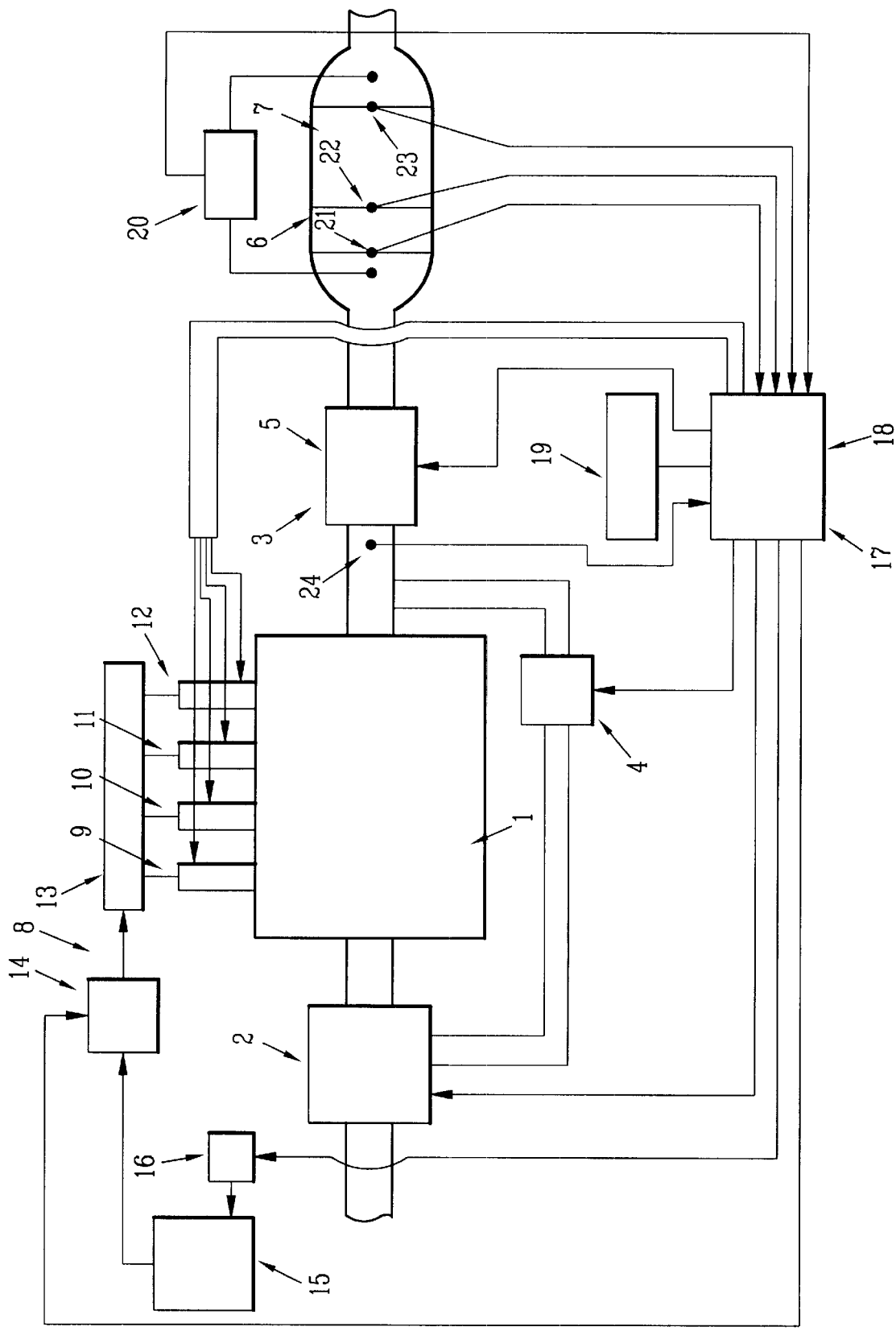

SYSTEM FOR ASSISTING THE REGENERATION OF A PARTICLE FILTER INTEGRATED INTO AN EXHAUST LINE OF A MOTOR VEHICLE DIESEL ENGINE

FIELD OF THE INVENTION

The present invention relates to a system for assisting the regeneration of a particle filter integrated into an exhaust line of a motor vehicle diesel engine.

It is known that design engineers are constantly preoccupied with reducing the pollutant emissions associated with the running of motor vehicle engines and, in particular, of diesel engines.

Various systems have already been developed in the prior art in order to reduce the level of these pollutant emissions, particularly using a particle filter integrated into the exhaust line.

However, managing the functioning of the latter and, in particular, managing its regeneration also is present difficulties.

The object of the invention is, therefore, to solve these.

BRIEF DESCRIPTION OF THE INVENTION

For this purpose, the subject of the invention is a system for assisting the regeneration of a particle filter integrated into an exhaust line of a motor vehicle diesel engine, characterized in that the engine is linked to various members including:

means for the admission of air into the engine, means for recycling the exhaust gas from the engine at the inlet of the latter, a turbocompressor, an oxidizing catalyst arranged upstream of the particle filter in the exhaust line;

a system for the common supply of fuel to the cylinders of the engine, comprising electrically controlled injectors associated with these cylinders, means for adding to the fuel an additive intended to be deposited onto the particle filter in order to lower the combustion temperature of the particles trapped in the latter, means for the acquisition of information relating to various operating parameters of the engine and of the members linked to the latter, and means for checking the operation of the admission means, of the recycling means, of the turbocompressor and/or of the supply system in order to control the operation of the engine, these means also being designed to trigger a regeneration phase of the particle filter by combustion of the particle trapped in the latter, at the same time initiating a phase of multiple injections of fuel into the cylinders of the engine during their expansion phase, and in that the checking means are designed to trigger closing of the means for recycling the exhaust gases at the inlet of the engine during a regeneration phase of the particle filter, so as to make it possible to check the composition of the gases at the inlet of the particle filter and isotorque operation of the engine.

BRIEF DESCRIPTION OF THE DRAWINGS

The invention will be understood more clearly from reading of the following description given purely by way of example and made with reference to the accompanying drawing which shows a block diagram illustrating a motor vehicle diesel engine and the various members linked to the latter.

DETAILED DESCRIPTION OF THE INVENTION

To be precise, this FIGURE shows a motor vehicle diesel engine which is designated by the general reference 1.

This diesel engine is linked to means for the admission of air at the inlet of the latter, which are designated by the general reference 2.

At the outlet, this engine is linked to an exhaust line which is designated by the general reference 3.

Means for recycling the exhaust gas from the engine at the inlet of the latter are also provided and are designated by the general reference 4.

These means are then interposed, for example, between the outlet of the engine and the means 2 for the admission of air into the latter.

The exhaust line may also be linked to a turbocompressor, designated by the general reference 5, and, more particularly, to the turbo portion of the latter, in the conventional way.

Finally, the exhaust line comprises an oxidizing catalyst, designated by the general reference 6, which is arranged upstream of a particle filter, designated by the general reference 7, arranged in the exhaust line.

The engine is likewise linked to a system for the common supply of fuel to the cylinders of the latter. This system is designated by the general reference 8 in this FIGURE and comprises, for example, electrically controlled injectors associated with the cylinders.

In the exemplary embodiment shown, the engine is a four-cylinder engine and therefore comprises four electrically controlled injectors 9, 10, 11 and 12 respectively.

These various injectors are associated with a common fuel-supply rail designated by the general reference 13 and connected to fuel-supply means designated by the general reference 14 and comprising, for example, a high-pressure pump.

These supply means are connected to a fuel tank, designated by the general reference 15, and to means for adding to this fuel an additive intended to be deposited onto the particle filter in order to lower the combustion temperature of the particles trapped in the latter.

In fact, this additive may, for example, be contained in an auxiliary tank designed by the general reference 16 and associated with the fuel tank 15, so as to make it possible to inject a particular quantity of this additive into the fuel.

Finally, this engine of the various members which have just been described are likewise linked to means for checking their operation, designated by the general reference 17 in this FIGURE, comprising, for example, any suitable computer 18 associated with information storage means 19 and connected at the input to various means for the acquisition otthe information relating to various operating parameters of this engine and of these members, this computer then being designed to check the operation of the admission means, of the recycling means, of the turbocompressor and/or of the supply system in order to control the operation of the engine and, in particular the torque generated by the latter, as a function of the running conditions of the vehicle, in a conventional way.

Thus, for example, this computer is connected to a differential-pressure sensor 20, to the terminals of the catalyst and of the particle filter 6 and 7 respectively, and to temperature sensors 21, 22 and 23 respectively, upstream of the catalyst between this catalyst and the particle filter and downstream of this particle filter in the exhaust line.

The computer can also receive information on the oxygen content of the exhaust gases from a lambda λ probe designated by the general reference 24 in this figure and integrated into the exhaust line.

At its output, this computer is designed to control the air admission means, the exhaust gas recycling means, the turbocompressor, the means for adding the additive to the fuel, the means for supplying fuel to the common rail and the various injectors associated with the cylinders of the engine.

In particular, this computer is designed to trigger a regeneration phase of the particle filter by combustion of the particles trapped in the latter, at the same time initiating a phase of multiple injections of fuel into the cylinders of the engine during their expansion phase.

To be precise, the particles emitted by the engine while it is in operation are trapped in the particle filter. It is therefore appropriate to regenerate the latter regularly by combustion of these particles.

During the regeneration phase of the particle filter 7, the checking means 17 are designed to control closing of the means 4 for recycling exhaust gases from the engine at the inlet of the latter, thus making it possible to check the composition of the gases at the inlet of the particle filter and isotorque operation of the engine.

These recycling means may comprise an opening/closing solenoid value.

This makes it possible to maintain comfort while the vehicle is being driven.

What is claimed is:

1. System for assisting the regeneration of a particle filter integrated into an exhaust line of a motor vehicle diesel engine and comprising:

means for admitting air into an inlet of the engine;

selectively closeable means for recycling the exhaust gas from the engine at the engine inlet;

a turbocompressor;

an oxidizing catalyst arranged upstream of the particle filter in the exhaust line;

means for commonly supplying fuel to cylinders of the engine and having electrically controlled injectors associated with the cylinders;

means for adding an additive to fuel, the additive deposited onto the particle filter in order to lower combustion temperature of the particles trapped in the filter;

means for acquiring information relating to selected operating parameters of the engine and of members linked thereto;

means for checking the operation of the admitting means, the recycling means, the turbocompressor and the supply system in order to control the operation of the engine;

the checking means triggering a regeneration phase of the particle filter by combustion of the particles trapped in the latter, at the same time initiating a phase of multiple injections of fuel into the cylinders of the engine during their expansion phase;

the checking means further closing the means for recycling the exhaust gases at the inlet of the engine during a regeneration phase of the particle filter to enable the checking of the composition of the gases at the inlet of the particle filter and isotorque operation of the engine.

2. A system according to claim 1, characterized in that the recycling means comprises an opening and closing solenoid valve.

* * * * *